June 4, 1957 J. C. PLASTARAS 2,794,487
PHOTOGRAPHIC FILM CORRECTION APPARATUS
Filed Oct. 8, 1954 13 Sheets-Sheet 1
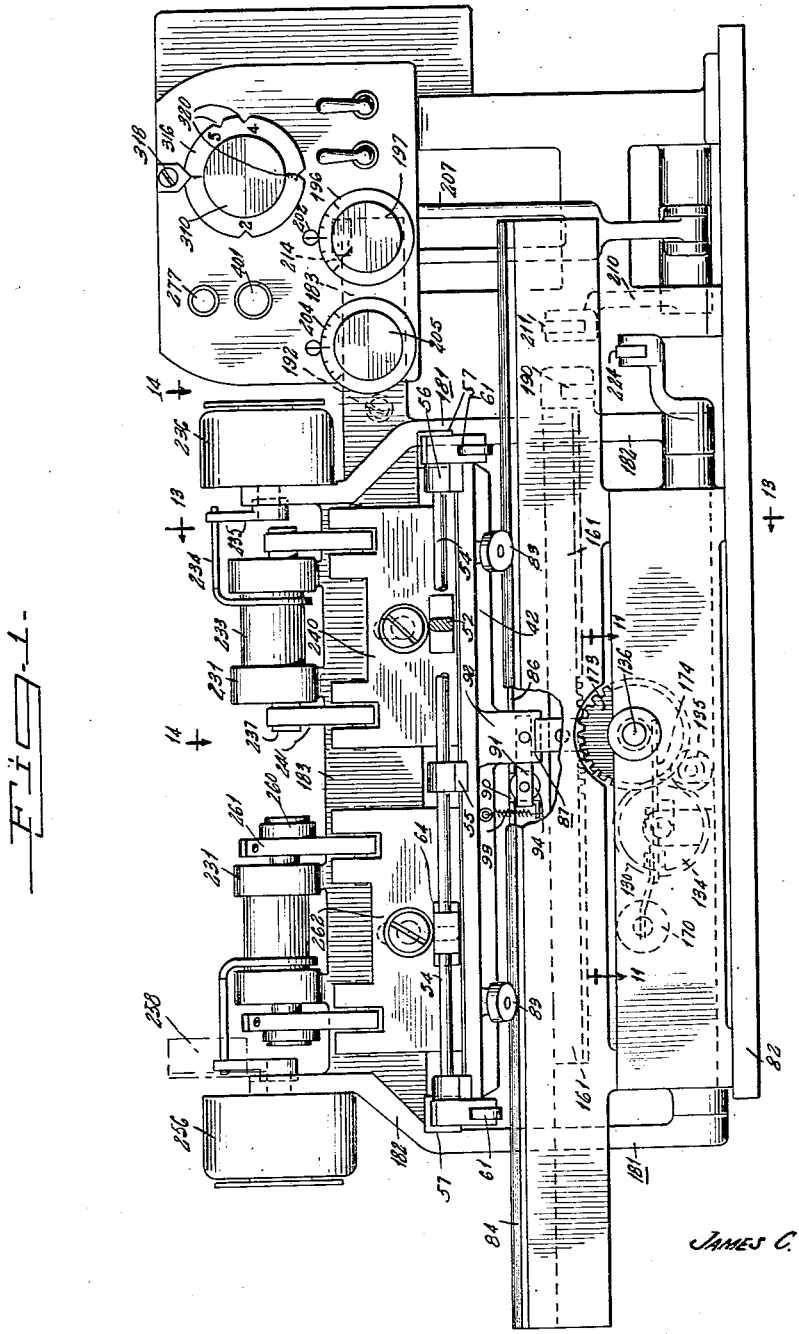
INVENTOR.
JAMES C. PLASTARAS
BY
ATTORNEYS

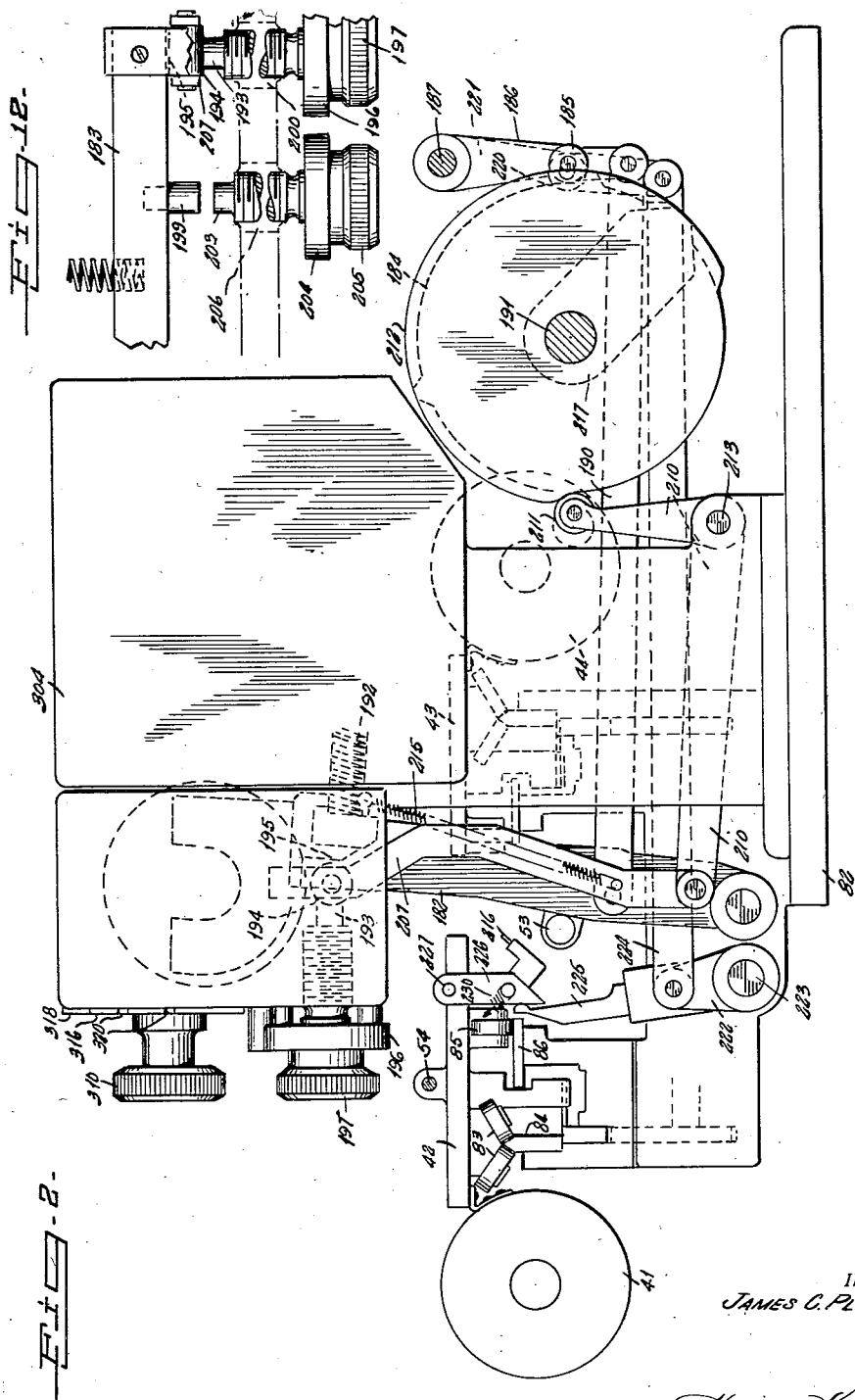

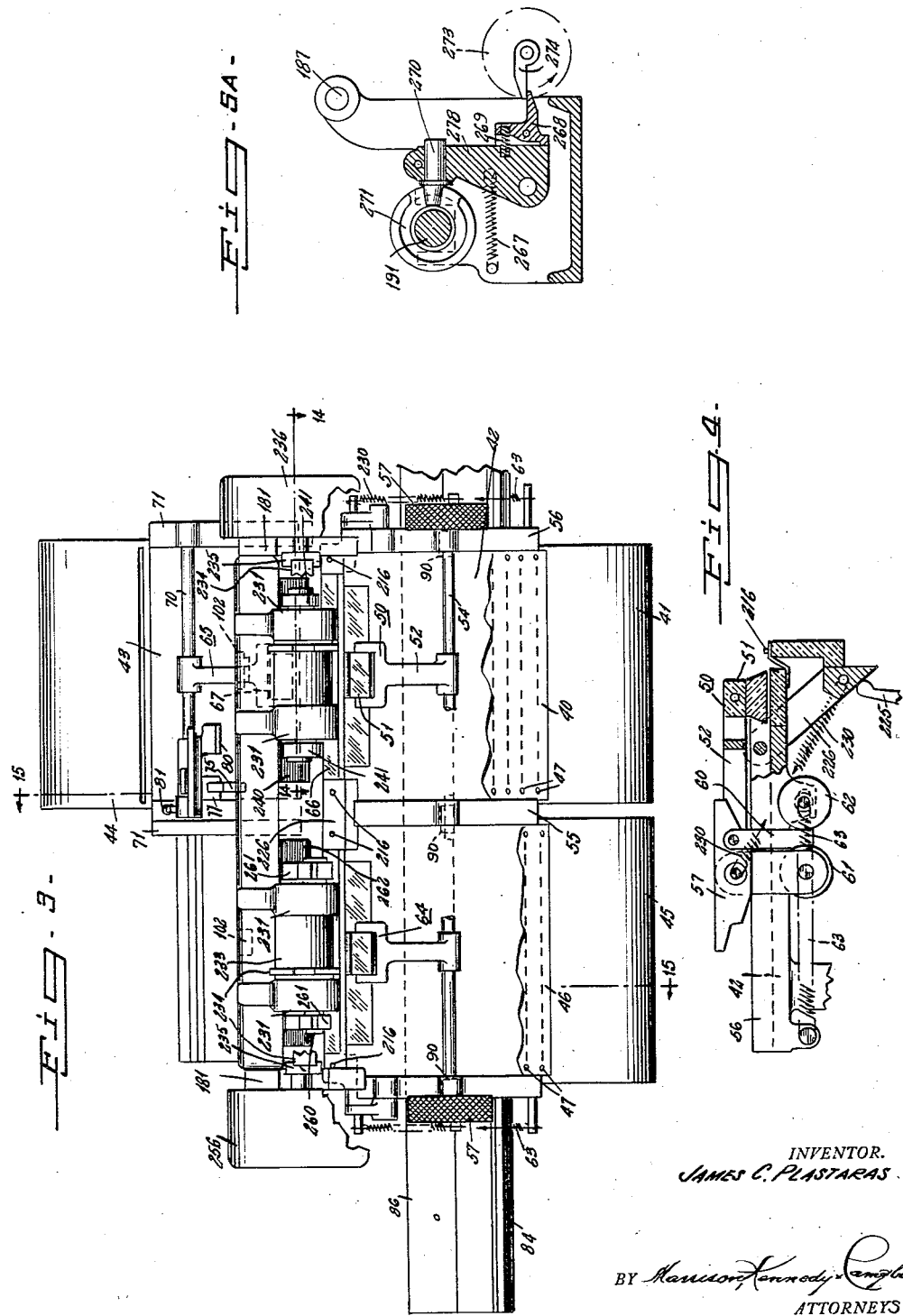

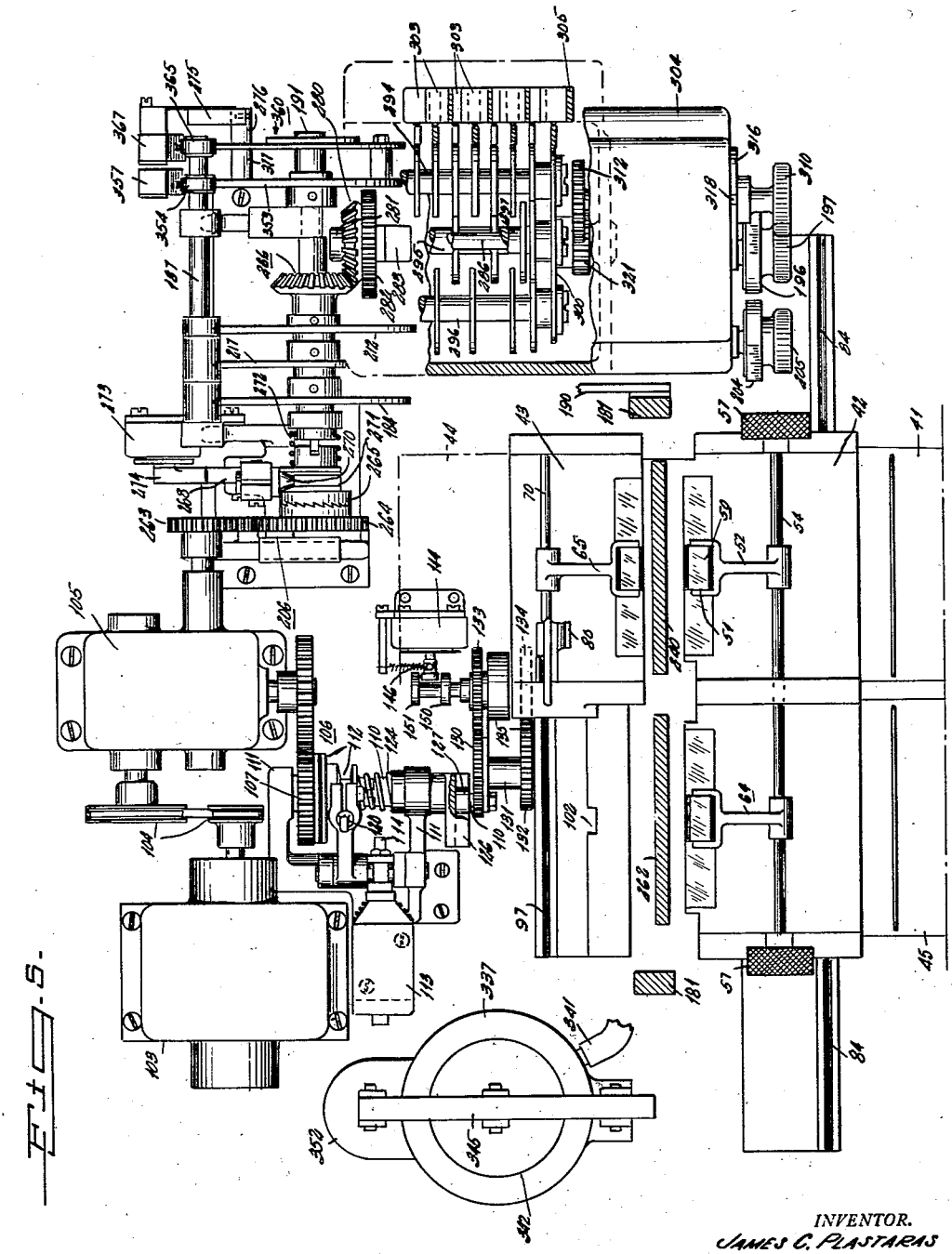

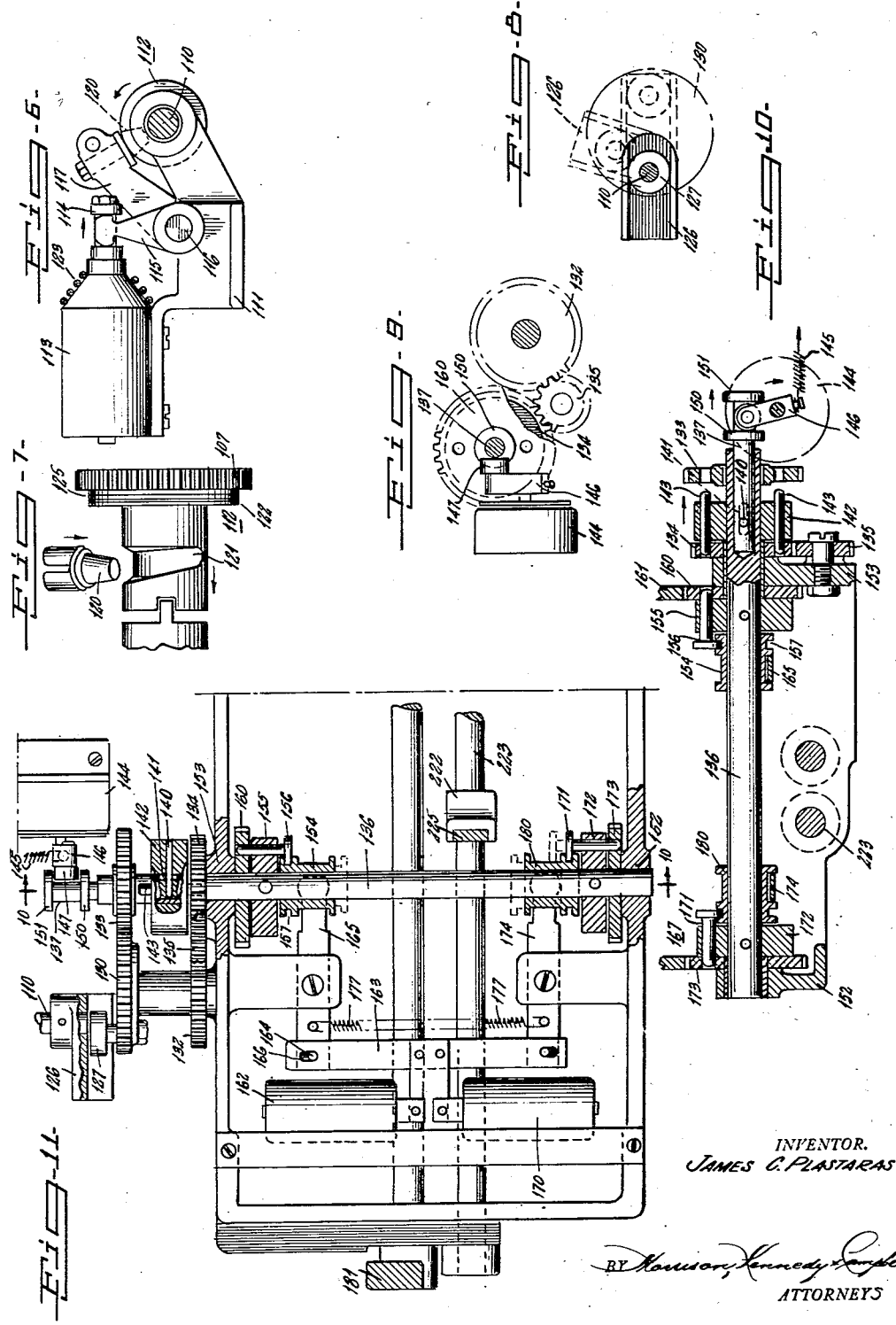

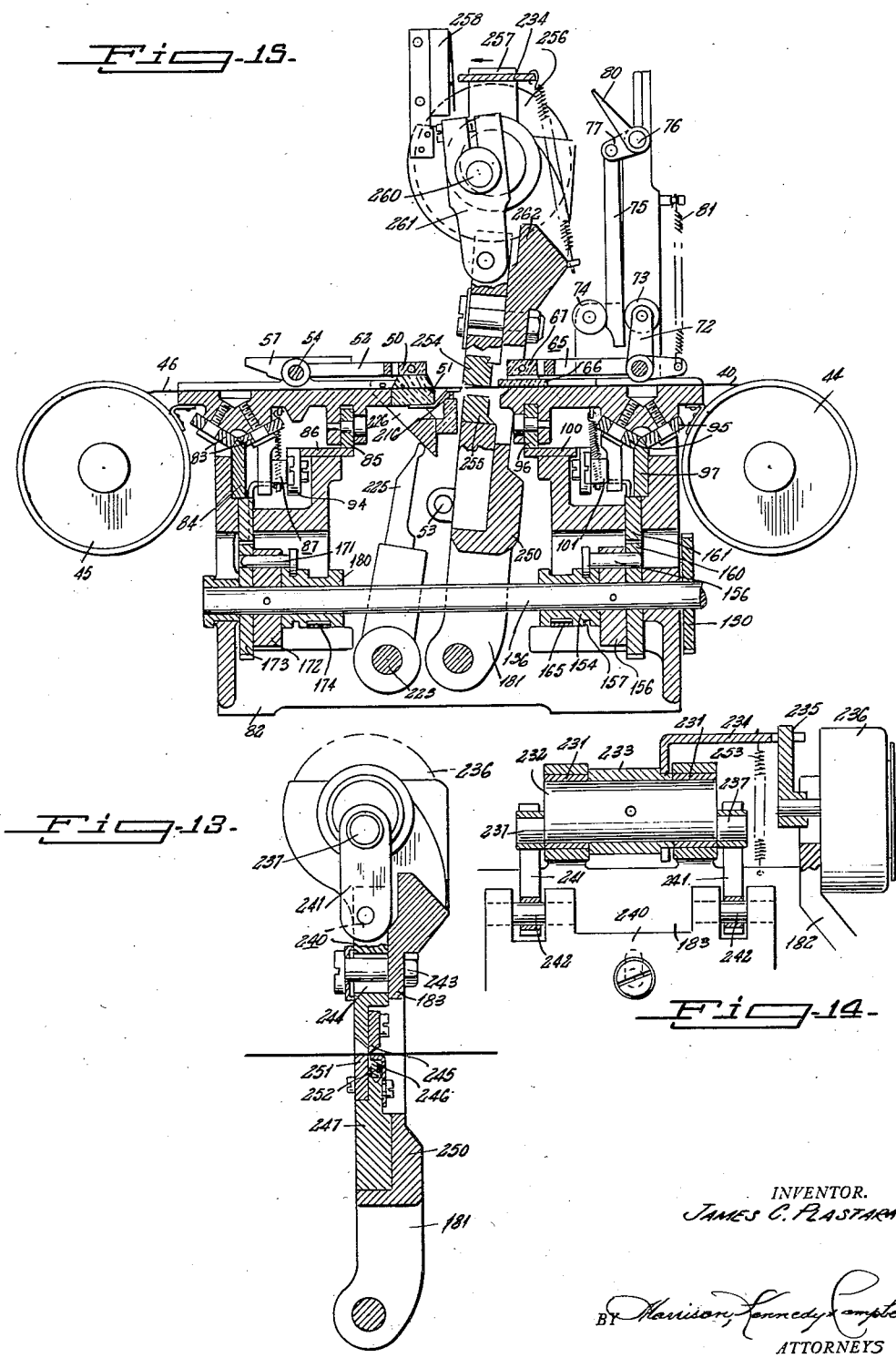

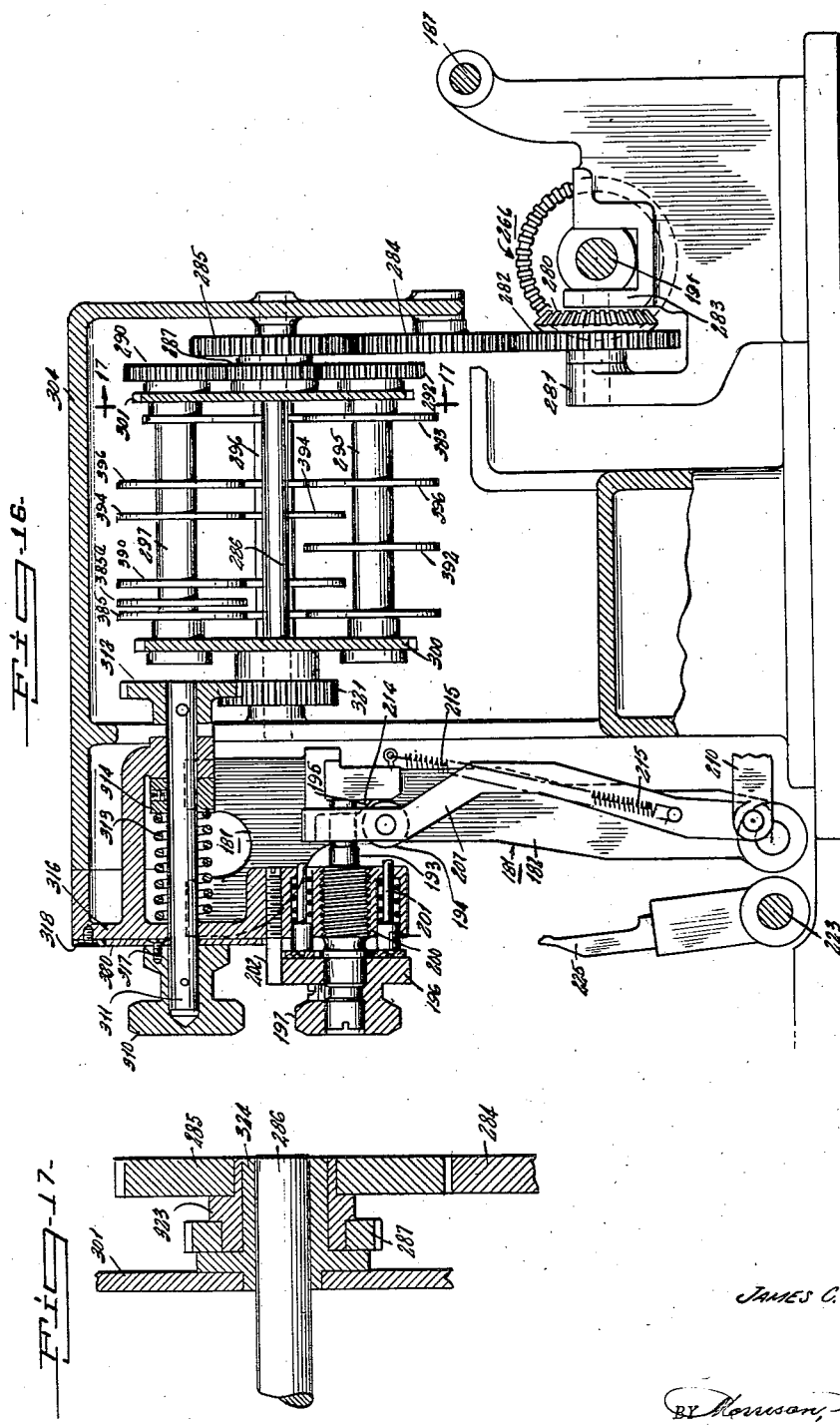

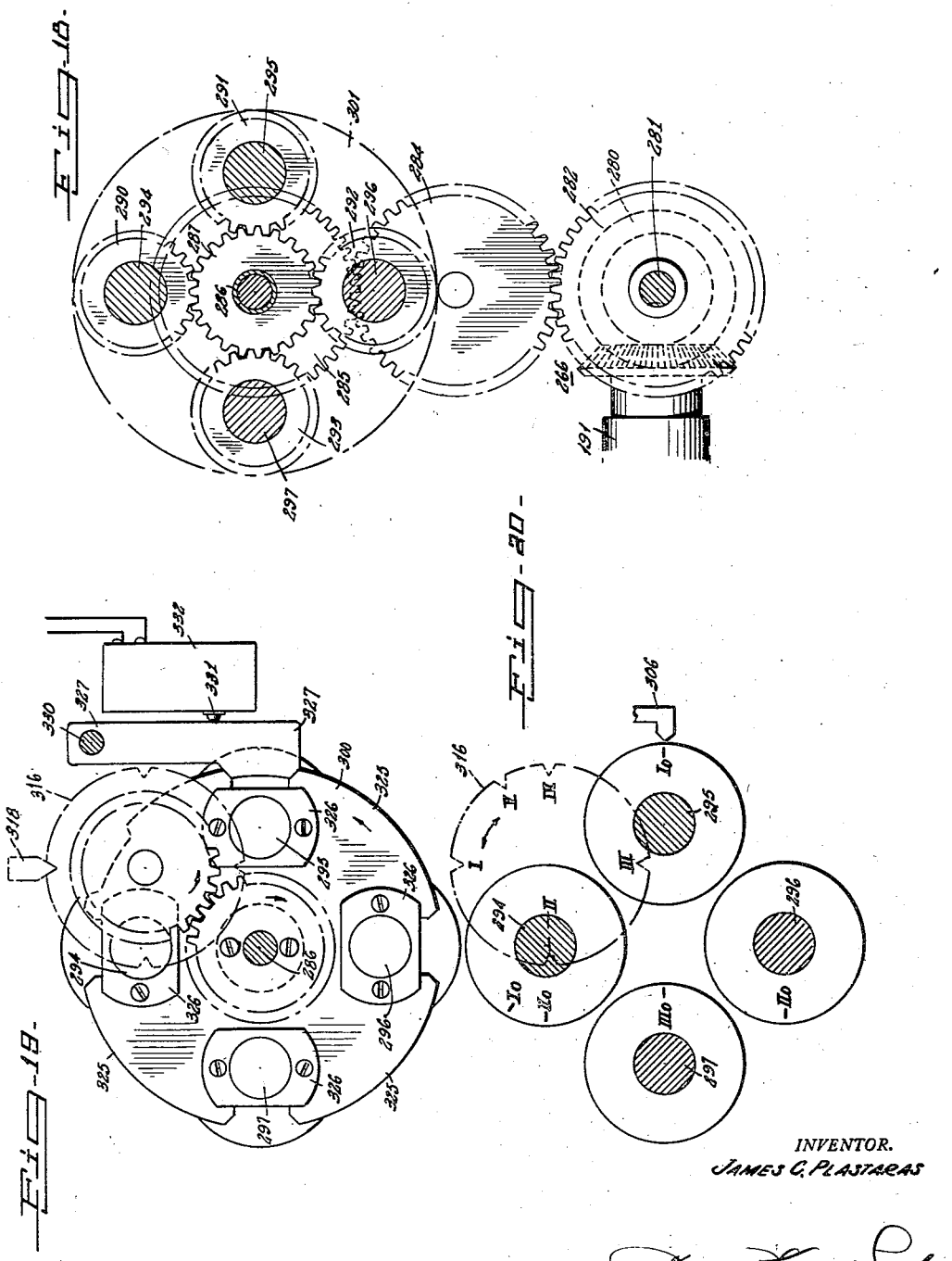

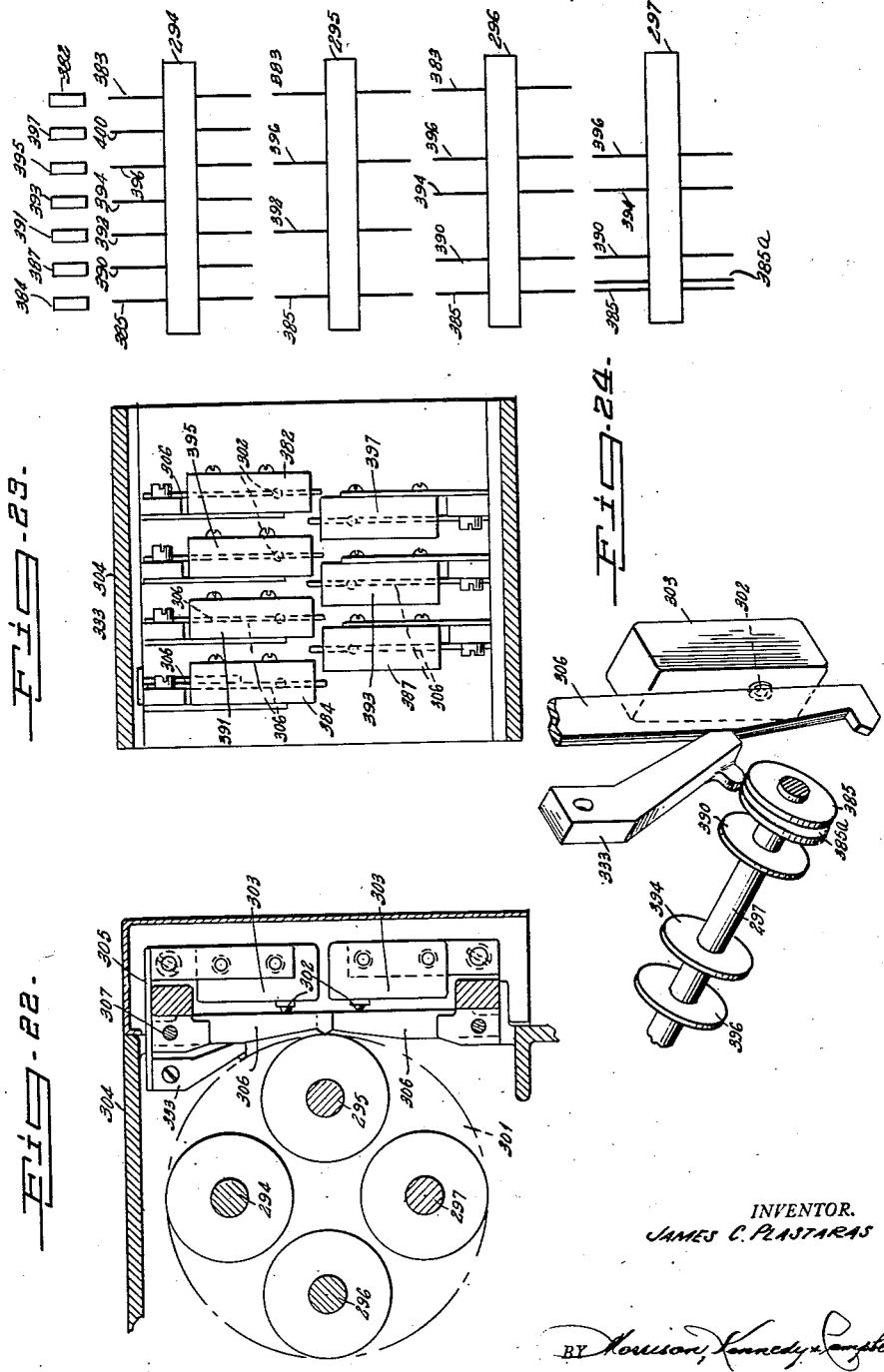

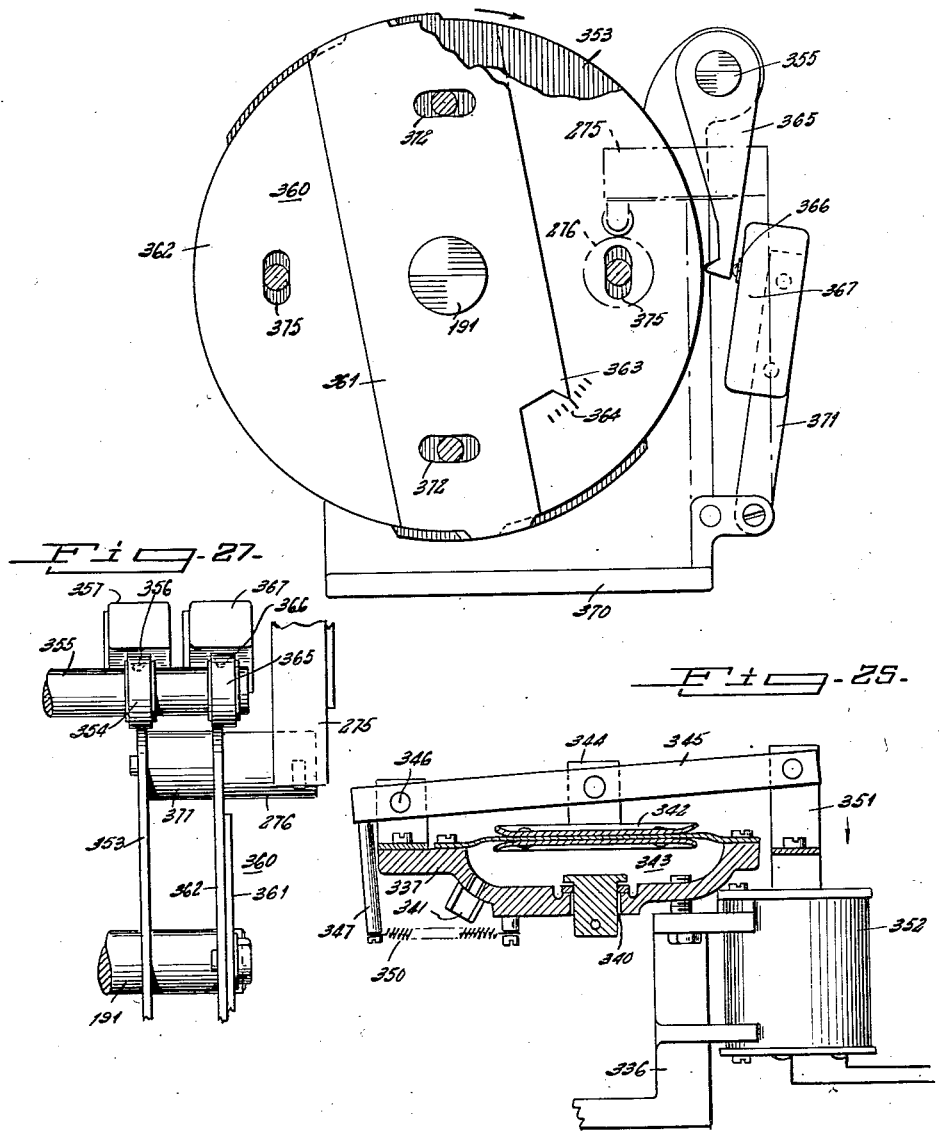

June 4, 1957 J. C. PLASTARAS 2,794,487
PHOTOGRAPHIC FILM CORRECTION APPARATUS
Filed Oct. 8, 1954 13 Sheets-Sheet 11
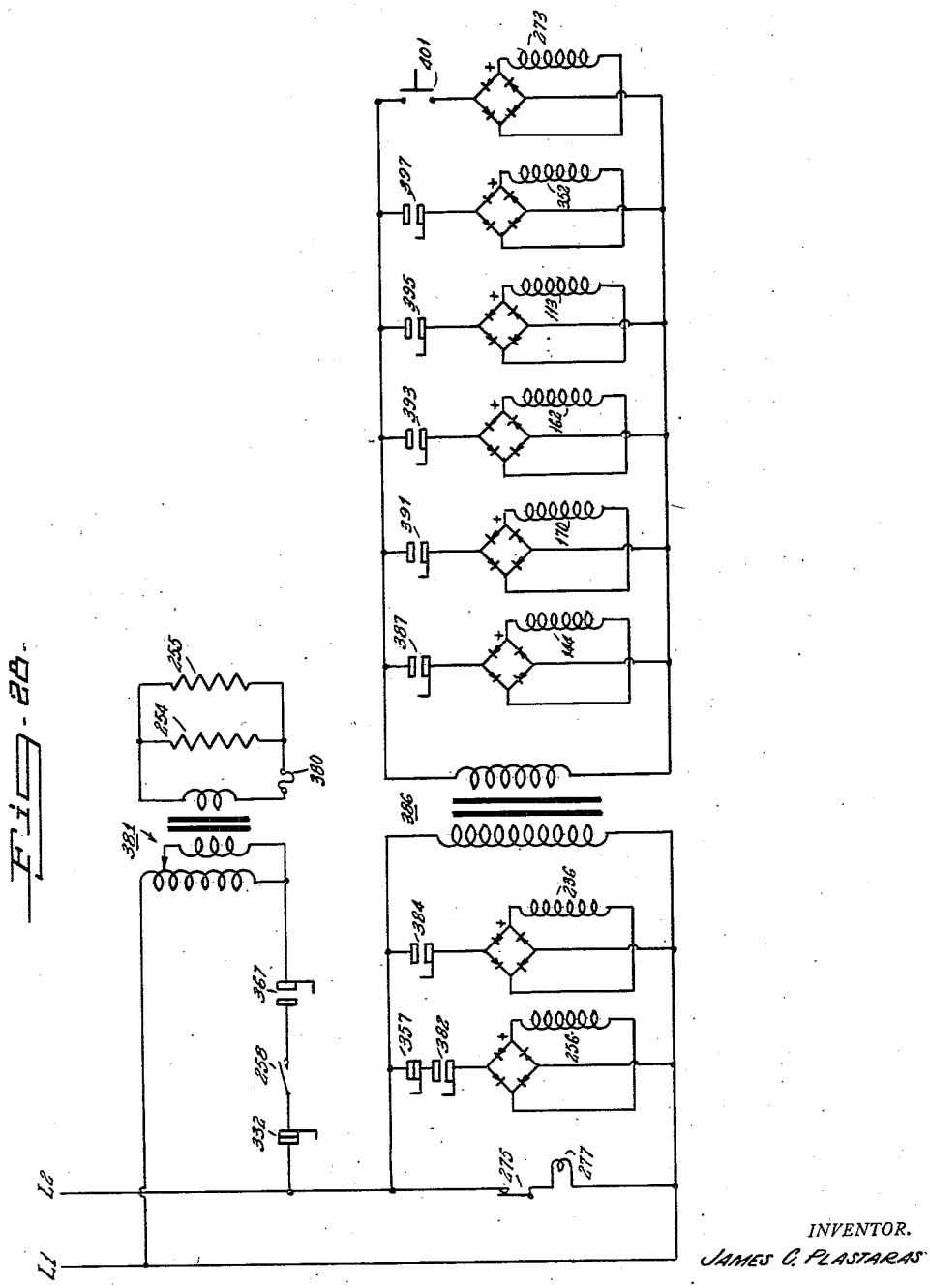
INVENTOR.
JAMES C. PLASTARAS
ATTORNEYS June 4, 1957   J. C. PLASTARAS   2,794,487
PHOTOGRAPHIC FILM CORRECTION APPARATUS
Filed Oct. 8, 1954   13 Sheets-Sheet 12
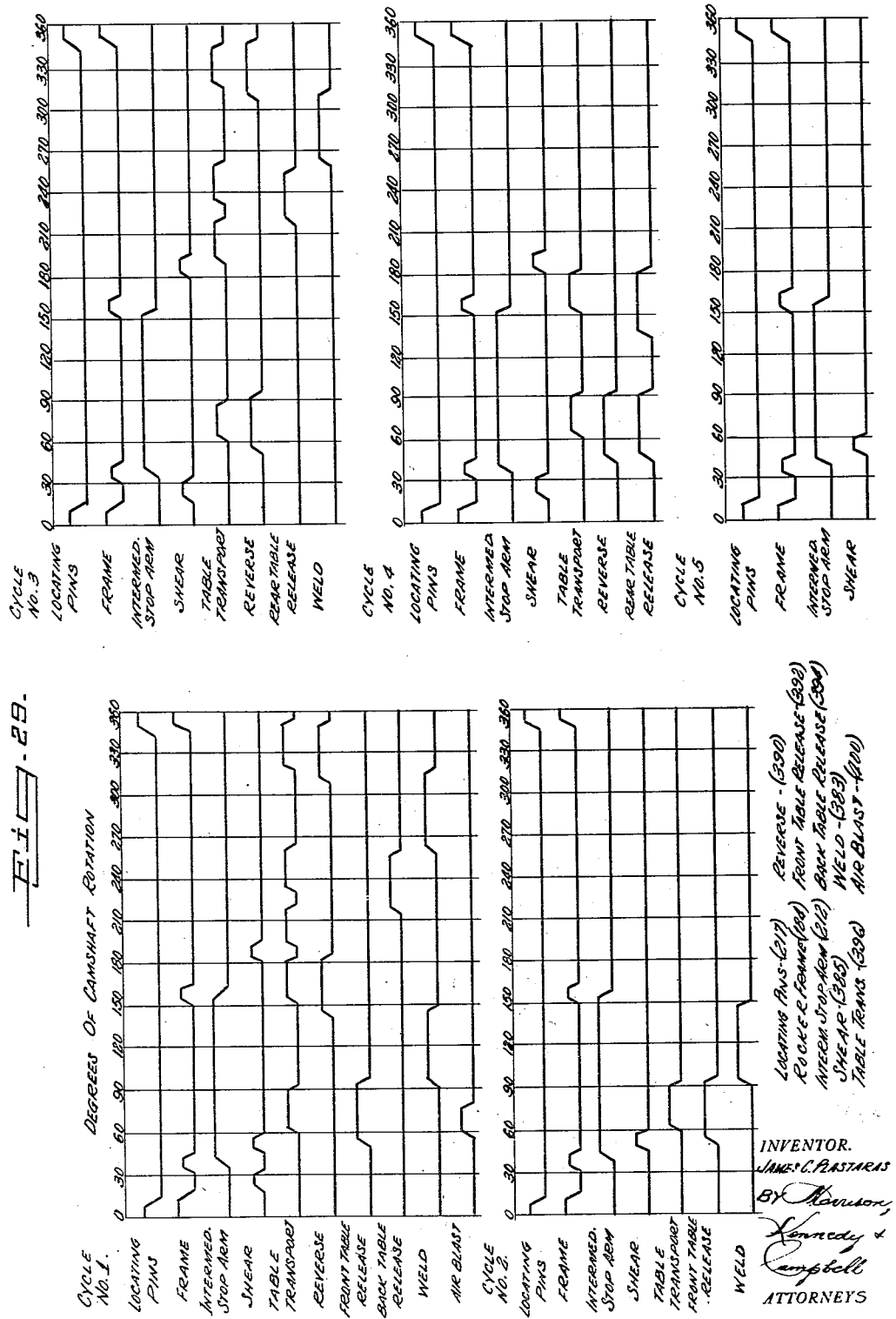
INVENTOR.
JAMES C. PLASTARAS
BY
ATTORNEYS

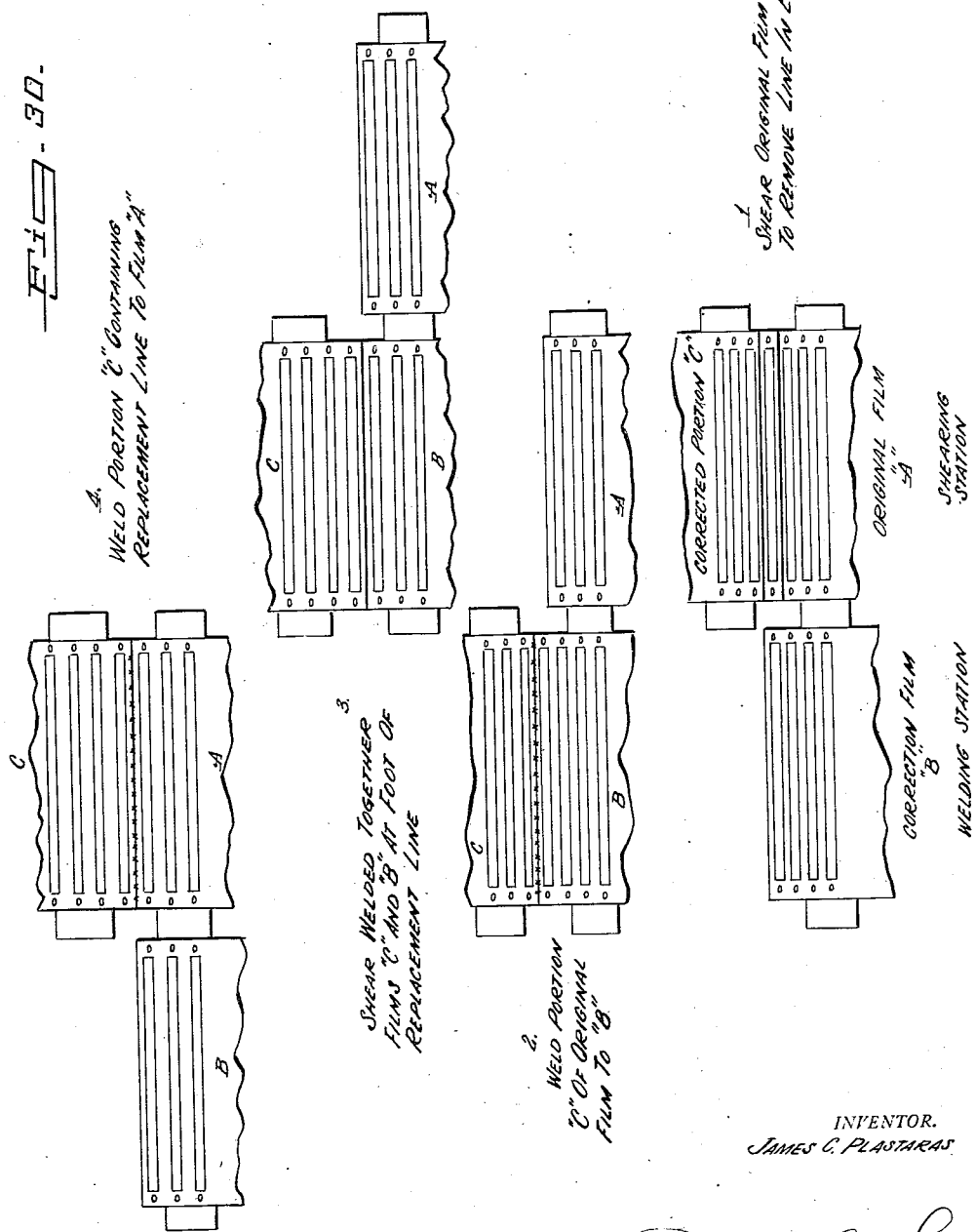

United States Patent Office 2,794,487
Patented June 4, 1957

2,794,487

PHOTOGRAPHIC FILM CORRECTION APPARATUS

James C. Plastaras, Lynbrook, N. Y., assignor to Mergenthaler Linotype Company, a corporation of New York Application October 8, 1954, Serial No. 461,070

25 Claims. (Cl. 154—42.1)

This invention relates to an apparatus for correcting filmed text matter which has been recorded in a phototypographical machine and more particularly to a mechanism whereby the film correction is carried out automatically.

In co-pending application Serial No. 422,862 filed April 13, 1954 and assigned to the assignee of the present invention there is disclosed a method and means for correcting a phototypographical film in which there is provided a film which comprises lines of correct text matter, each of which is to serve as a correction for a corresponding incorrect line of text on an original film. The original film and the correction film are placed on reels, adjacent one another, on a table which permits the films to be transported in a direction parallel to the axes of the reels. The lines of correct text which make up the correction film appear in the same sequence as the incorrect lines of the original film appear when the latter is unwound from its reel and carried across the table to a take-up reel mounted on a second table movable in a direction parallel to the first table. In making a correction, the original film is advanced over the tables until an incorrect line is uncovered at which time the film is fixedly located by a pair of pins engaging perforations at both ends of the incorrect line and clamped in this position to both tables. The correction film is advanced until the correct line corresponding to the incorrect line is located by a second pair of pins engaging perforations at both ends of the correct line whereupon this film is also clamped in position. The incorrect line is severed from its film, thus leaving it in two spaced apart sections, by a film severing device which is movable to effect a head cut and a foot cut. The head of the original film (that portion on the take-up reel) is transferred to a welding station where it abuts the leading edge of the correction film and is welded thereto. Thereafter the two tables are transported to carry the welded-together original and correction film to the cutting station wherein the film severing device is positioned to sever this film at the foot of the line being inserted in the original film. When this has been accomplished the tables are again transported to bring the head of the original film, to which the correct line is now secured, and the foot of the original film to the welding station where the two are welded to form a corrected film. The corrected original film and the correction film are then restored to their original positions in readiness for a subsequent correction. While the foregoing operations are manually determined in the above noted application, the present invention contemplates automatic functioning of the apparatus.

Specifically, the invention is directed to an apparatus wherein severing and splicing operations encountered in the correction of a film containing errors and the transport of films to the severing and splicing units are automatically carried out in a predetermined sequence.

The object of the invention is to provide an apparatus for correcting phototypographical film in which a minimum amount of manual operations or manipulations is required.

Another object of the invention is to provide an apparatus which, after the film is located therein, will automatically respond to actuation of a starting switch and effect the removal of an incorrect line of text and the substitution therefor of a corresponding correct line.

Still another object of the invention is to provide an apparatus wherein any selected one of various predetermined sequences of operations may be had.

In carrying out the invention there is provided an apparatus having two tables for supporting an original film containing errors and a correction film bearing correct lines corresponding to incorrect lines of the original film. The tables are transportable between a shearing unit and a splicing unit, either in unison or separately, by a reversible power drive. The shearing and splicing units are arranged for relative movement transverse to the table-supported films and these movements are automatically cam controlled to take place in the proper order of a film correction sequence. Similarly, operations of the shearing unit and the splicing units to effect their respective functions are automatically cam controlled as are the movemens for selectively transporting the tables between the two units. These latter operations may vary in sequence for different corrections and therefore means are provided for changing from one sequence of operations to another.

Features and advantages of the invention will be gained from the foregoing and the description which follows.

In the drawings:

Figure 1 is a front elevation, with portions broken away, showing the film corrector apparatus;

Figure 2 is a simplified side elevation of the apparatus;

Figure 3 is a top plan view showing that part of the apparatus for clamping the films in place;

Figure 4 is a detailed view illustrating the front table film clamping mechanism;

Figure 5 is a top plan view, with portions broken away, showing the film corrector apparatus;

Figure 5A is a side elevation of a one cycle clutch mechanism;

Figure 6 is a detailed view showing a clutch engaging mechanism;

Figure 7 is a view showing the cam action for disengaging the clutch;

Figure 8 is a detailed view showing the mechanism for imparting a variable speed drive to the table mechanism;

Figure 9 is a detailed view, with portions broken away, showing the gear drives for the table drive mechanism;

Figure 10 is a sectional view showing the mechanism for driving the tables in either of two directions;

Figure 11 is a view, partly in section, taken along line 11—11 of Figure 1 and showing the mechanism for selectively connecting the tables to the driving mechanism;

Figure 12 is a schematic representation showing the adjustable stop mechanism;

Figure 13 is a segmental sectional view taken along line 13—13 of Figure 1;

Figure 14 is a sectional view taken along line 14—14 of Figure 3;

Figure 15 is a sectional view taken along line 15—15 of Figure 3;

Figure 16 is a side elevation, with parts broken away and partly in section of the apparatus;

Figure 17 is a detailed sectional view taken along line 17—17 of Figure 16;

Figure 18 is a schematic representation of the gear train operating the sequencing cams;

Figure 19 is a detailed view showing the construction of one end ring and the switch operated thereby;

Figure 20 is a schematic view showing the positioning of the cams on their respective cam shafts;

Figure 21 is a schematic representation of the cams carried by the various cam shafts to give the various sequences of operations;

Figure 22 is a simplified view showing the relationship of the cam operated switches to the cams;

Figure 23 is a simplified view showing the mounting arrangement for the cam operated switches;

Figure 24 is a perspective view showing the cam arrangement for one sequence of operations;

Figure 25 is a sectional view of the air blast mechanism;

Figure 26 is a side elevation of the welding cycle control cams;

Figure 27 is a fragmental plan view of the apparatus shown in Figure 26;

Figure 28 is a simplified wiring diagram showing the circuits for the cam controlled solenoids employed in the apparatus;

Figure 29 is a cam timing chart which shows the sequence of operations for the various operating cycles of the apparatus; and Figure 30 is a schematic representation of the various steps in the film correcting method.

Reference will be made to the figures of the drawings conjointly in describing a preferred arrangement of the film correction apparatus and where the description is particularly illustrated in one of the figures, reference to the specific figure will be made.

The film, which is produced in a phototypographical machine and which comprises lines of text matter some of which will contain errors of sundry kinds, is designated 40. After processing, this original film is wound on reel 41 and drawn over the mechanism tables 42 and 43 to a take-up reel 44. Immediately adjacent reel 41 is a storage reel 45 on which is disposed a correction film 46 which comprises various lines of text, correctly composed and corresponding to incorrectly composed lines on the original film. The lines of text on film 46 follow one another in the same order that incorrect lines on the original film appear as it is advanced from reel 41 to take-up reel 44. In addition, the lines of text on film 46 are immediately adjacent one another even though the corresponding incorrect lines on film 40 are spaced apart with correct lines therebetween. Specifically, the lines of text are spaced apart normal interline space distances. Furthermore, if two successive lines on correction film 46 are of different point size, their spacing on the film will be equal to one half the sum of normal interline spacing for one point size and normal interline spacing for the other point size. In this manner, as a replacement line is severed from the correction film the blank space above the next succeeding replacement line will be only that which will correctly locate the line as it is spliced to original film 40. If the interline space is not as noted, additional cutting operations will be included in the sequence of operations hereinafter described. Disposed at both ends of a line of text on both films 40 and 46 are perforations 47 which bear a fixed relation to the text matter of the associated lines. These perforations are for the purpose of locating the films in the apparatus so that when the incorrect line is removed from film 40 and replaced by a correct line of text from film 46, the change will be accomplished without affecting the interline spacing of the corrected film.

Above table 42 in position to firmly hold the film 40 as it is unwound from reel 41 is a film clamp 50 which comprises a rigidly backed transparent pad 51 pinned for pivoted movement to forked arm 52. The pad 51 is transparent as is that portion of table 42 immediately thereunder in order that film 40 may be readily scanned to discover the incorrect lines as the film is advanced across the tables. To the end that the text matter may be viewed easily, there is provided a source of light 53 (Fig. 15) beneath the table positioned to direct the light therefrom upwardly through the transparent portions of the mechanism and the film. The arm 52 is keyed to a rocker shaft 54 which is journaled in film guides 55 and 56. One end of shaft 54 extends through guide 56, and is keyed to handle 57. Depending from handle 57 is member 60 which extends between rigidly fastened roller 61 and displaceable roller 62, the latter of which is pulled toward roller 61 by spring 63. The arrangement is such that when handle 57 is actuated to rock shaft 54, arm 52 is pivoted to cause pad 51 to firmly grasp film 40. Pivoting of the handle depresses member 60 such that roller 62 is displaced and spring 63 tensioned. The spring force causes the rollers to tightly grasp member 60 and hold it in depressed position, thus resulting in the film remaining clamped even though the attendant lets go of the handle. To release the film, the handle is manually restored to normal position, thus rocking shaft 54 and removing the pressure from pad 51. A similar mechanism 64 is provided for clamping film 46 to table 42 as it is unwound from reel 45.

Rearwardly of clamp 50 and disposed to grasp the corrected film which is to enter take-up reel 44 is another clamp 65 (see Figs. 3 and 15). This clamp is quite similar to the previously described one in that pad 66 is pivotally pinned to forked arm 67 which in turn is pinned to rocker shaft 70. The shaft is journaled in film guides 71 and is provided with an arm 72 having a roller 73 on the end thereof spaced from a fixedly mounted roller 74. Positioned between the roller is member 75 which is connected to handle shaft 76 through the intermediary of link 77. The shaft is rocked by forward and rearward movement of V-handle 80. As the handle is pivoted rearwardly (clockwise in Fig. 15) link 77 is rotated clockwise to raise member 75 and bring the narrow portion thereof between the rollers to thereby permit tension spring 81 to rock shaft 70 and cause pad 66 to clamp film 40 to rear table 43. Contrariwise, forward movement of the handle depresses member 75 to separate the rollers 73 and 74 and unclamp the film. In the latter instance arm 72 is pivoted backwards to rock shaft 70 and tension spring 81. The clamp will consequently be in either of two positions depending on the position of handle 80.

Front table 42 is disposed on the mechanism base 82 for longitudinal movement thereon. The forward edge of the table is provided with two pairs of rollers 83, the rollers in each pair being arranged so that their bearing surfaces form an acute angle to ride on the beveled edges of guide rail 84. A pair of vertically arranged wheels 85 ride on bearing plate 86 and support the rear edge of table 42. Table 42 is also provided with a pawl 87 (Fig. 1) which is arranged to engage detents 90 on base 82 and which comprises a lever 91 pivotally supported on table projection 92 and urged upwardly toward base 82 by spring 93. A roller 94 on the extremity of the lever engages the appropriate detent to fix the location of the table in one of the three positions it may occupy during a film correction operation.

Rear table 43 is similarly provided with rollers 95 and wheels 96 whereby the table may be moved along guide rail 97 and bearing plate 100. Table 43 is also provided with a pawl 101 for engaging detents 102 on the base 82 but, as will hereafter be apparent this table is only transported between two operating positions and consequently there will only be two detents provided in the rear portion of base 82.

The tables 42 and 43 are moved between their operating positions by a power drive means which will now be described with particular reference to Figure 5. An electric motor 103 operates through belt and pulleys 104, and speed reducing unit 105 to rotate spur gears 106. Gear 107 is mounted on shaft 110 which is journaled in supporting bracket 111. Adjacent the gear is spring engaged clutch 112, control of which can best be understood by reference to Figures 6 and 7.

Engagement of the clutch is controlled by solenoid 113, the plunger 114 of which terminates in a grooved portion, the shoulders straddling lug 115 of rock shaft 116. Keyed to shaft 116 is arm 117 which carries clutch disengaging finger 120. The finger in turn is positioned to engage internal cam 121 which is integral with the movable clutch face 122. Spring 123 urges plunger 114 into extended position so that rock shaft 116 is urged in a clockwise direction and finger 120 is held in engagement with cam 121 to overcome the force exerted by clutch engaging spring 124 and disengage the clutch. To engage the clutch, solenoid 113 is energized to rock shaft 116 in counterclockwise direction thereby pivoting finger out of engagement with the cam surface. With the finger thus removed, compression spring urges the moveable clutch face 122 into engagement with clutch member 125.

The shaft 110 which is turned by gears 106 when clutch 112 is engaged, terminates in a channel member 126 which is secured to the shaft but projects at right angles to the axis thereof. The side walls of the channel enclose a roller 127 which is rotatably secured to gear 130. The arrangement is such that as channel 126 is rotated, roller 127 moves along its length (see figure 8) thereby imparting a variable speed motion to the roller as it moves orbitally around the center of gear 130. Thus gear 130 will rotate at a low speed during certain portions of the cycle whereas at other times it will travel at a comparatively high speed. As will hereafter be seen, this insures that tables 42 and 43 will travel at a slow speed as they approach each of their rest positions thereby facilitating engagement of the pawl and appropriate detent.

Movement of roller 127 upon rotation of channel 126, of course, turns gear 130 and with it, shaft 131 and gear 132. Gear 130 directly drives gear 133 and gear 132 drives gear 134 through the intermediary of gear 135. Therefore, gears 133 and 134 rotate in opposite directions, they both being free to rotate relative to table drive shaft 136. The mechanism whereby shaft 136 is rotated by gear 133 or gear 134 can best be seen in Figure 10.

The extremity of shaft 136 is tubular in form and carries therein sliding member 137. A pin 140 extending through member 137 also extends through elongated slots 141 found in the side walls of the tubular portion of shaft 136. The pin engages intermediate driving member 142. Member 142 is provided with two connecting rods 143 whereby the member can be joined to either of gears 133 or 134 for rotation therewith. Consequently as member 137 is translated between two limiting positions, member 142 is also translated between the limiting positions. In one position, member 142 is joined to gear 133 and is rotated in one direction therewith. In the other position, member 142 is joined to gear 134 and therefore rotates in the opposite direction. Member 142 is, of course, connected to shaft 136 by pin 140 and through member 142, shaft 136 is rotated in either of the two directions to effect movement of tables 42 and 43 in either of the two directions. Movement of member 142 between its two limiting positions is shown controlled by rotary solenoid 144 and tension spring 145. Spring 145, acting on lever 146, urges roller 147 against shoulder 150 to drive member 142 into engagement with gear 134. Energisation of solenoid 144 pivots lever 146 clockwise, tensioning the spring and causing roller 147 to abut shoulder 151 and move member 142 into joined relationship with gear 133.

Referring now to Figure 11, the drive shaft 136 to which intermediate member 142 is pinned is journaled in the apparatus base at 152 and 153. Slideably positioned on shaft 136 is spool shaped engaging member 154. Also keyed to the shaft is pin carrying member 155. A pin 156 is slidably positioned in member 155 and its head rides in the peripheral groove 157 in the end rim of member 154. Thus, depending on the position of member 154 on shaft 136, pin 156 will either couple or not couple member 155 and pinion 160, the latter of which can freely turn on shaft 136. When the pin engages pinion 160, rotation of the shaft 136 will cause it to rotate and thereby drive table 43 through rack 161. On the other hand, when member 154 is positioned so that pin 156 does not engage pinion 160, rotation of shaft 136 is not transmitted to rack 161 and table 43 is not translated. Movement of member 154 along shaft 136 to engage or disengage pin 156 and pinion 160 is shown effected by a table release solenoid 162 which acts through T-bar 163, pin 164 and lever 165, to slide member 154. It will be noted that pin 164 extends through an elongated slot 166 in T-bar 163. A similar engaging member 167 is provided to effect the movement of table 42. A second solenoid 170 is provided, however, it disengage pin 171 carried by member 172 from pinion 173. Under normal circumstances, both pin engaging members are positioned so that both pinions are connected to drive shaft 136 and rotated when the shaft is rotated. If it is desired to transport front table 42 only, rear table release solenoid 162 is energized to move T-bar 163 towards the rear of the apparatus (upwardly in Figure 11) and pivot lever 165 clockwise thereby disengaging pin 156 from pinion 160. Consequently if shaft 136 is now rotated, such movement will not be transferred to pinion 160 and table 43 will remain in its former position. Movement of T-bar 163 upwardly will not affect lever 174 inasmuch as elongated slot 175 will prevent the exertion of any forces on pin 176. Spring 177 is connected to levers 165 and 174 to hold members 154 and 180 in engaging positions except when disengaged by the operation of either of solenoids 162 or 170. It is believed to be obvious that if it is desired to translate rear table 43 rather than table 42 front table release solenoid 170 will be energized to effect that result. If both tables are to be translated together, neither solenoid will be energized.

It has been pointed out above that the present mechanism effects the severing or cutting of the film and also the welding or splicing thereof. The severing apparatus and the welding apparatus now to be described are supported above the tables by a swingable frame 181, comprising stanchions 182 and a cross connecting web 183. The swingable frame 181 and the apparatus carried thereby are adapted to be in either of three positions. In the first instance this apparatus will be in a normal or non-operating position wherein the frame is swung back to its most rearward position. Under this condition, the position of the frame is controlled by cam 184 and follower roller 185. See Figure 2. Roller 185 is rotatably secured to lever 186 which pivots about shaft 187. The extremity of lever 186 is joined to stanchion 182 by link 190 which is pivotally connected to both the stanchion and the lever. Cam 184 is mounted on cam shaft 191 which is rotated by a motor drive which will hereafter be considered. For the present it will be assumed that the cam simply rotates. As roller rides off the high point of the cam, compression spring 192 urges the entire frame forwardly until movement is arrested by the abutment off intermediate stop 193, roller 194 and web member 195. See also Figure 12. This is the intermediate position for the swingable frame and is that position at which a head cut or splice is effected. To regulate the exact position of the shearing and splicing apparatus, stop 193 is adjustable in accordance with the point size of the line being replaced. Referring to Figure 16, a calibrated dial 196 is provided with a knurled knob 197 by which stop 193 may be advanced or withdrawn through threaded bushing 200. A pair of spring loaded studs 201 bear against the underside of dial 196 and thereby maintain the stop in its adjusted position as indicated by marker 202.

A similar stop 203 located alongside the intermediate or "head cut" stop controls the position of the frame to effect a foot shear or splice. Again, this stop comprises a dial 204 calibrated in accordance with the point size of the line containing the error, and a knurled knob 205 whereby the stop is positioned within threaded bushing 206. The forward motion of the frame to this third or foot cut position is determined by the engagement of web projection 199 and stop 203. It will be noticed that this is effected by the removal of roller 194 from between stop 193 and member 195. The mechanism for this action is cam controlled. The roller 194 is rotatably mounted on intermediate stop arm 207 which is pivotally connected to bell crank 210. A cam follower 211 on the extremity of crank 210 follows cam 212 and when it reaches the cam rise, the crank is pivoted counterclockwise about point 213. This action pulls arm 207 downwardly thereby bringing the roller 194 into engagement with the mitered surface 214 of web member 195. The frame is still urged in a forward direction by compression spring 192. A tension spring 215 connected between member 195 and arm 207, restores the bell crank 210 to its normal position wherein roller 194 is positioned between stop 193 and member 195 when follower 211 reaches the low point of cam 212. When it is desired to raise or lower the intermediate stop arm, frame 181 is moved rearwardly under the control of cam 184 to permit the frictionless positioning of the arm without the necessity of overcoming the force exerted by spring 192.

Although in the foregoing description the movements of the swingable frame were considered to be from its normal or rest position, to its intermediate or "head cut" position, to its third or "foot cut" position, it will be appreciated that this was done to simplify the description. As will hereafter be seen, the frame will move from its normal position, to its foot cut position and thereafter to its head cut position and thence to its normal position. This latter preferred sequence will be seen to minimize the number of steps or operations that take place during the correction of the film.

Figure 2 also shows the mechanism by which film locating pins 216 are moved into a projecting or operative position. This mechanism is likewise cam controlled. Cam 217 engages roller 220 to pivot lever 221 about shaft 187, the roller being rotatably fastened to the lever. The end of the lever is connected to arm 222 of rock shaft 223 by link 224, the link connections being pivotal. Spaced from arm 222 but keyed to rock shaft 223 is pin actuating arm 225. When rock shaft 223 is pivoted in a clockwise direction by action of cam 217, arm 225 pivots pin member 226 counter-clockwise about point 227 to thereby raise pins 216 to a position wherein they can engage the perforations of the film being located. A tension spring 230 restores the pins to their non-operative position when follower 220 rides off the cam surface.

Figures 13 and 14 show in section the cutting apparatus for severing the film. The web 183 has fashioned thereon near the top, a pair of spaced apart bushings 231 in which a shaft 232 is arranged. This shaft is provided with a sleeve 233 and projection 234 pinned thereto and adapted to be engaged by solenoid arm 235 which in turn is secured to the shaft of the rotary solenoid 236. Energization of the solenoid causes shaft 232 to be rocked in bushings 231. At the ends of shaft 232 are eccentrics 237 which are connected to the knifeholder 240 by means of links 241. The links are pivoted on both the eccentrics and the pins 242 of the knifeholder. The knifeholder 240 is held flush against web 183 by a bolt 243 passing through an elongated slot 244 in the holder which thus permits the knifeholder to be moved vertically with respect to the web. A knife 245 is provided at the lower extremity of holder 240. Below the knife is the cutting face 246 carried by support 247 which in turn is secured to the lower portion 250 of the web 183. A stripping member 251 is provided directly under the knife edge to form a resilient cutting surface. Compression spring 252 aids in restoring the stripping member 251 to normal position after a cut has been made. A spring 253 is provided to maintain the knife 245 in normal position and to restore it to this position a severing operation has been effected and solenoid 236 deenergized. It is clear from Figures 2 and 13 that as frame 181 is pivoted in response to the rotation of the cams, the knife is carried to different positions above film 40 and can completely remove an incorrect line therefrom.

Figure 15 shows the welding or splicing apparatus carried by the frame. As is apparent, this apparatus is quite similar to the cutting apparatus except that heating elements 254 and 255 are provided in place of the knife 245 and the cutting surface 246. As in the case of the knife, heating element 254 is actuated in response to the energization of a rotary solenoid 256 which rocks member 257 and eccentrics 260. A pair of links 261 join the eccentrics to the movable heating element holder 262 which is mounted on web 250 in a manner similar to knifeholder 240. A mechanical switch 258, is actuated when the welding apparatus is operated to bring the heating elements together.

It has been pointed out above that the appratus of the present invention contemplates the automatic performance of the above described operations in a selected sequence. The sequencing means and drive mechanism therefor will now be considered with reference to Figure 5.

A power source, that is, electric motor 103, heretofore described as the motive power for transporting film tables 42 and 43, also actuates the sequencing cams. The drive extends from the motor, through belt and pulleys 104, speed reducing unit 105 to spur gears 263. From gear 264, the drive extends through toothed clutch 265 to the bevel gears 266. The toothed clutch is normally out of engagement due to the action of tension spring 267 urging lever finger 270 into engagement with cam 271 and overcoming the force exerted by compression spring 272. See Figure 5A. Energization of starting solenoid 273 swings arm 274 to pivot bell crank 268 which in turn pivots lever 278 to remove finger 270 from engagement with cam 271 and permit compression spring 272 to force the clutch faces into engagement. Before solenoid arm 274 finishes its movement it swings free of crank 268 thereby permitting tension spring 267 to urge lever towards its normal position. By this time, however, cam 271 has rotated and lever cannot return to its clutch disengaging position until the cam has completed a single revolution at which time finger 270 drops into position to disengage the clutch. When solenoid 273 is deenergized, arm 274 is returned to normal position by a spring internal to the solenoid and not shown. The return movement pivots crank 268 counterclockwise to compress spring 269. It is thus apparent that the apparatus can undergo only a single cycle of operations each time solenoid 273 is energized.

An electromagnetic switch 275 is provided adjacent shaft 191 and in position to be operated by member 276 when shaft 191 is in zero position, i. e. at the completion of a cycle of operation. Contacts on the switch are employed to signal the attendant when the apparatus is functioning by illuminating pilot lamp 277 (Fig. 1). When the shaft is in zero position the lamp is extinguished.

Cams 184, 212 and 217 before described in connection with the swingable frame positioning mechanism are shown mounted on shaft 191 which is now seen to be operated by electric motor 103.

The driven bevel gear 280 is keyed to stub shaft 281 as is gear 282, the shaft being supported in brackets 283. Gear 282 drives gear 284 which in turn directly drives gear 285 to rotate shaft 286 and thereby turn gear 287. As can best be seen in Figures 16 and 18, turning of gear 287, rotates the several orbitally arranged gears 290, 291, 292 and 293. These gears are keyed respectively, to shafts 294, 295, 296 and 297 which are rotatably supported in end rings 300 and 301 to form somewhat of a squirrel cage. Each of the orbital shafts carries a plurality of cams, shown schematically in Figure 21, which are, therefore, rotated in response to the actuation of gear 287. However, only a single group of cams carried by a single shaft will be in operating position. That is, only the cams on a single shaft will operate plungers 302 of mechanical switches 303. See Figure 22. The switches are located adjacent one side of the squirrel cage and are fastened to the mechanism cover 304 by angle brackets 305. They are shown alternately disposed above and below the cam operating position in Fig. 23. This arrangement is desirable in that it minimizes the space requirements of the cam mechanisms. Disposed between the switches and the cam surfaces are a plurality of levers 306 which can independently pivot on rods 307 under the influence of the cams. Pivoting of a lever results in the plunger of the associated switch being depressed, thus engaging a pair of electrical contacts to complete an electric circuit for one of the solenoids heretofore mentioned and thereby imitate a control function.

If it is desired to obtain a different sequence of operations, a second set of cams will be moved into operative position. The mechanism for accomplishing this can best be seen by reference to Figure 16. A handle 310 is keyed to shaft 311, on the other end of which is pinned gear 312. A compression spring 313 bearing against shoulder 314 and frame 315 urges the shaft into one limiting position with the underside of the sequence dial 316 abutting frame 315. A pin 317 on the dial secures it to the handle for movement therewith. The handle is maintained in a selected position by the engagement of marker 318 with detents 320 formed around the edge of dial 316. In order to select a new group of cams, handle 310 is pulled outwardly against the action of spring 313 and then rotated. Gear 312 engages gear 321 so that turning of the former by handle 310 rotates gear 321 and shaft 286 to which the end rings 300 and 301 are keyed. The sectional detailed view of Figure 17 shows that shaft 286, collar 323 and the end ring 301 can freely turn within the bushing 324 which carries gears 285 and 287. Contrariwise, when the squirrel cage is locked in position with one group of cams operatively disposed, gears 285 and 287 can be rotated by the power drive mechanism to rotate the various cam shafts and cams without affecting shaft 286 on the end rings carrying the various orbital cam shafts.

Figure 19 shows, in detail, end ring 300. It is noted that this ring comprises a series of cam segments 325 joined by bushing pieces 326. The cam segments serve to pivot lever 327 about pin 330 and thereby depress plunger 331 of mechanical switch 332 and separate a pair of electrical contacts to interrupt a control circuit. One of the cam segments is provided with a depressed surface which, when the lever 327 comes opposite it, will permit the switch contacts to be engaged. This position corresponds to an operative position of the squirrel cage. The circuit will be interrupted whenever the squirrel cage is being turned to bring a different cam group into operating position. In this manner energization of the power drive mechanism will be prevented while an apparatus adjustment is being completed.

Figure 24 shows the arrangement of the cam operated mechanism for one sequence control group. In this case only one cam will operate one mechanical switch. An auxiliary lever 333 is provided to be acted upon by cam 385A. The other cams on shaft 297 will not be in position to operate their associated levers but this one cam and its auxiliary lever will actuate the mechanical switch at the appropriate time.

In Figure 20 the position of the various cams on their respective shafts are shown together with a representation of the dial 316 associated with handle 310. The dial is provided with markings I, II, III, IV and V corresponding to five cam sequences. If it is desired to have the apparatus perform sequence I, handle 310 is turned until dial marking I is aligned with pointer 318. As a further example if sequence IV is desired, handle 310 is turned until marking IV is aligned with pointer 318. The operating position for each cam group is shown by the schematic representtaion of switch 332. At the beginning of a cam cycle, the zero position of the cams should be aligned with the switch. The zero positions for the various cams are marked I 0, II 0, III 0, IV 0, and V 0. With the arrangement shown when a dial marking is aligned with pointer 318, the zero position for the corresponding cams is aligned in switch operating position.

In Figure 25 there is shown an air blast mechanism which is employed to direct a stream of air to severed pieces of film to aid in removing them from the apparatus. Fastened to the apparatus bracket 336 is the dished out member 337 having an air inlet 340 and the air outlet port 341, the latter being connected near the shearing tool by a flexible hose. A metal bellows 342 is secured to member 337 to provide an air chamber 343. The central portion of the bellows is furnished with a lug 344 whereby lever 345 can apply pressure to the bellows, working it inwardly and outwardly. The lever is fulcrumed at pin 346 but it extends beyond the pin and terminates in an arm 347 to which tension spring 350 is fastened. The spring urges the bellows outwardly to bring air into chamber 343. The other end of lever 345 is pivotally connected to plunger 351 of solenoid 352, energization of which forces the bellows inwardly to expel the air in chamber 343 through the outlet port to aid in the removal of pieces of film. Deenergization of the solenoid allows spring 350 to return the bellows to normal positition and at the same time draw air in through inlet 340.

Referring now to Figures 26 and 27 there is shown a group of cams fitted to shaft 191 and which serve to control the heating cycle of the splicing unit. The auxiliary pressure control cam 353 operatively engages lever 354 which pivots on rock shaft 355 to depress plunger 356 of switch 357 and thereby engage contacts to complete a portion of an electric circuit hereafter to be considered.

The heating cycle timing cam 360 comprises two sections 361 and 362 which are rotatable with respect to one another so that the raised portion of the cam may be adjusted to provide the exact time of heating which may be required. To facilitate this adjustment, section 361 is provided with a marker 363 which coincides with scale 364 on section 362. The raised portions of the two sections together operate pivoting lever 365 to depress plunger 366 of switch 367 and engage a pair of contacts. Switch 367, as is switch 357, is bracketed to apparatus stand 370 by member 371.

Section 361 of cam 360 is provided with elongated slots 372 which correspond with threaded holes 373 in section 362. A bolt 374 passes through slot 372 and is threaded into hole 373 thus holding the sections in an adjusted position. In a similar manner, section 362 is adjustably connected to cam 353. Here section 362 is provided with the elongated slots 375 and cam with the threaded bolt holes 376. A spacer 377 is furnished between the two cams. It is clear that cam 353 is keyed to shaft 191 whereas cam sections 361 and 362 can freely turn thereon, their positions being determined by the adjustable settings.

Reference will now be made to Figure 28 which shows a simplified wiring diagram for the apparatus. In this diagram the switch contacts will be designated by a reference numeral which will be found applied to the switches illustrated in the schematic representation of Figure 21. Similarly the solenoid coils will be given the same character that was applied to the solenoid in the foregoing part of the description. The electric motor 103 which runs continuously when the apparatus is being used is not shown, nor is the fluorescent light 53 which is used to illuminate the film as it is inspected on the tables.

A pair of lead-in lines L1 and L2 connect the circuits to a source of alternating current (not shown). The heating units 254 and 255 for the welding apparatus are shown connected, through a fuse 380, to the secondary winding of a variac 381, the primary winding of which is connected to the lead in lines L1 and L2 through the normally closed contacts of safety switch 332, and contacts 258 and 367. Contacts 258 engage when the two welding elements 254 and 255 have been brought together and contacts 367 engage under the influence of heating cycle timing cam 360.

Connected in parallel across lines L1 and L2 are the circuits for the welding unit solenoid 256 and the shearing unit solenoid 236. The circuit for the former is traced from line L1 through a full wave rectifier bridge connected circuit, contacts 382 and 357 to line L2. The solenoid coil 256 is connected to the D. C. side of the bridge circuit. Contacts 382 engage under the influence of sequencing cam 383 whereas contacts 357 are engaged by auxiliary pressure cam 353. It is apparent that the circuit for the shearing unit solenoid is quite similar except that it is completed through contacts 384 operated by sequencing cam 385.

Also connected across lines L1 and L2 is the primary winding of stepdown transformer 386. The secondary winding energizes circuits for the reversing solenoid 144 through contacts 387 operated by cam 390, the front table releasing solenoid 170 through contacts 391 operated by cam 392, the rear table releasing solenoid 162 through contacts 393 operated by cam 394; the table transport solenoid 113 through contacts 395 actuated by cam 396; the air blast solenoid 352 through contacts 397 actuated by cam 400; and the cam shaft clutch solenoid 273 through push button contacts 401. Each of the solenoid coils is energized from the D. C. side of a full wave rectifier bridge circuit similar to that employed in the welding unit solenoid circuit. The sequence of solenoid operations can be seen by reference to the timing chart of Figure 29. Below the chart, the explanatory material is keyed to certain numbers which are parenthetically enclosed and which represent the reference characters for the sequencing cams which control the associated function.

In describing an operation of the apparatus it first will be assumed that the correction will involve the removal of a single line of text and its replacement by a single line of correctly photographed text. The apparatus is in normal position with the swingable frame in its rearmost position and locating pins in their projected position. The film 40 which is to be corrected is on reel 41 and the correction film is found on reel 45.

Film 46 is advanced so that the locating holes at the ends of the first line of corrections are engageable with the locating pins. The clamp handle is next actuated to clamp the film firmly to the table 42. The operator advances film 40 across the tables, winding it on to take up reel 44 until the incorrect line which is to be replaced by the first correct line of film 46 is located by pins 216 and locating perforations 47 at the ends of the incorrect line. Handles 57 and 80 are thereupon actuated to clamp film 40 to both tables 42 and 43 respectively.

In the next order of adjustments, dials 196 and 204 are set in accordance with the point size of the line to be replaced in film 40. These dials, of course, control the exact position of abutment screws (stops) 193 and 203 and thereby control the positions which the knife and welding units will take to make the foot cut and splice and the head cut and splice respectively. The cuts will be made above and below an incorrect line a distance equal to one half the normal interline spacing for text of the same point. Having thus set the mechanism, the attendant is ready to initiate the process of replacing the incorrect line in film 40 with the correct line from film 46. In doing this the attendant will set the cycle sequence dial 316 to the number one position.

Electric motor 103 is running but clutches 112 and 265 are disengaged and consequently the apparatus is at rest. This is signalled to the attendant by the non illumination of pilot light 277. Depressing the starting push button 401 completes a circuit for the cam shaft clutch solenoid 273 to engage clutch 265. As was heretofore noted, the clutch engaging mechanism will permit only a single cycle of operations. Upon engagement of the clutch, the frame position control cams begin rotating as do the sequencing cams carried by the squirrel cage.

The sequence of operations can readily be followed by reference to Figure 29. Cam 217 pivots arm 225 to permit the locating pins 216 to be retracted by spring 230. Thereafter rocker cam 184 is rotated thereby permitting swingable frame to be spring urged to its foremost position as determined by stop 203. In this position the mechanism is positioned at the foot of the incorrect line. At this time contacts 384 are engaged by a sequencing cam to complete a circuit for the shearing solenoid 236 thus resulting in the severing of the film.

Next, rocker cam 184 swings the frame back to its intermediate position and cam 212 moves arm 207 upwardly until roller 194 is interposed between stop 193 and web member 195. The mechanisms are now in position for an operation at the head of the incorrect line and the sequencing cam again causes the engagement of contacts 384 and the energization of shearing solenoid 236 to sever film 40 and thereby complete the severing operations for the removal of the incorrect line. Contacts 397 are then engaged to complete a circuit for the air blast solenoid 352 and thus expel the air from the air chamber 343 to insure the removal of the small severed piece of film.

After the removal of the incorrect line a circuit is completed for front table release solenoid 170. It will be remembered that energization of front table solenoid results in this table being disconnected from the drive and consequently this prepares only the rear table for movement by leaving it the only one connected to the drive. Thus when a sequencing cam 396 completes a circuit for table drive clutch solenoid 113 through contacts 395, the rear table 43 carrying the head of film 40 will be transported to the welding station. Upon arrival there, a welding operation takes place to splice the head of the original film to the correction film. By this time front table release solenoid has been deenergized and both tables are again connected to the driving mechanism.

A sequencing cam thereupon completes a circuit for reversing solenoid 144 so that when table drive clutch solenoid 113 is again energized both the rear table and the front table are transported. In this instance the joined films are moved to the shearing station in preparation for the removal of the replacement line from the correction film.

During the foregoing operations, frame 181 was in position for head cuts or welds by means of intermediate stop arm 207 being in raised position. Now the frame is rocked rearwardly to permit the arm to be withdrawn whereupon the frame is rocked forward to its foremost, i. e. foot cut, position. Sequencing cam 335 thereupon completes a circuit to effect a shearing operation thus severing the replacement line from the correction film. Subsequent energization of the table drive clutch 112 transports both tables one position so that the head of the original film and the correction film are brought to the welding station. Immediately thereafter back table release solenoid is energized to disconnect this table from the drive mechanism. Thus when the table drive clutch is again engaged, only the front table will be transported. This brings the foot of the original film into coincidence with the head of the original film, both sections being in the welding station. With the films thus located, a welding operation occurs to rejoin the original film sections. At this time, the incorrect line has been removed and replaced by a correct line from the correction film.

The last order of operations is to restore the original film to position at the shearing station and the correction film to position at the welding station, these being the normal or starting positions of the films prior to a correction operation. This movement is carried out by sequencing cam 390 causing the energization of the reversing solenoid 144 and while this is in operative condition, the energization of the table drive clutch solenoid is effected to transport both tables to their normal positions. Thereafter rocker cam 184 moves the swingable frame to its rearmost position and locating pins 216 are projected into operating position. The attendant then releases the film clamps and locates the next line to be replaced after which the foregoing is repeated.

Figure 30 schematically illustrates the sequence of film movements followed in the film correction process.

While the foregoing represents the typical correction which will take place in an apparatus, such as the one described, in that it contemplates the correction of a single line of text at a time, it is recognized that other conditions may require the removal and replacement of several successive lines of text. In this latter instance the heretofore described sequence of operations would be time consuming inasmuch as it would effect the correction one line at a time. Consequently, this apparatus is provided with means for performing several correction sequences, one of which already has been described.

It will now be assumed that a multiple line correction is to be made. The attendant proceeds as above except that the cycle sequence dial is turned to the number two position. This action brings a second set of sequencing cams into operative position and these will result in an abbreviated cycle of operations which will only be outlined inasmuch as they all appear in the above description but now occur in a different order.

As before, initially, the locating pins are projected and frame 181 is in its rearmost position. After the intermediate stop arm 207 is raised and the forward movement of the frame 181 is arrested by its engagement with roller 194 on arm 207, the shearing solenoid is energized to sever the original film at the head of the incorrect line. The front slide release solenoid is then energized so that when the table drive clutch 112 is engaged, only the rear table is transported to bring the head of the original film into alignment with the correction film. When this has taken place, the final operation in this cycle takes place and this is a welding operation. The apparatus then comes to a halt in normal condition, that is, with locating pins 216 projecting and frame 181 in its most rearward position, but with the films located as indicated.

The attendant then advances the correction film to which the head section of the original film is now welded until the last line of the multiline replacement is located on pins 216. He also advances the foot section of the original film until the last line of the incorrect portion of the text is similarly located on the pins. Next, the attendant sets the cycle sequence dial in its number three position after which he will depress push button 401 to initiate the new cycle of operations. What in effect happens now is that the last cycle is completed. Thus the locating pins are retracted and the frame swung forward to the foot cut position. The shearing solenoid is energized and the incorrect portion of the original film is severed from the foot section thereof. Thereafter the reversing solenoid is energized and the table drive clutch is engaged thereby bringing the joined head section of the original film and the correction film to the shearing station. The shearing solenoid is again energized and the replacement portion of text is severed from the correction film, it already being joined at the head to the original film. The table drive clutch is then engaged to transport both tables, one position, in unison. Immediately upon this occurring, the rear table release solenoid is energized to disconnect the rear table from the drive mechanism. After the rear table is disconnected, the table drive clutch is again engaged to move the front table over one position or in other words to bring the foot section of the original film into alignment with the head section in the welding station. W welding operation then takes place to form a unitary corrected film. The reversing solenoid is then energized and the table drive clutch is engaged to bring the corrected film to its normal position in the shearing station. The locating pins are projected and the frame swung to its rearmost position ready for another correction cycle.

The fourth sequence cycle which is brought into operation by movement of handle 310 into position number four. This sequence is provided for trimming the lead of the correction film, this being the excess film ahead of the first correction line. It is clear that this sequence requires only the transportation of the front table to bring the correction film into the shearing station and thereafter returning the table to its normal position. It is contemplated that this trimming operation will take place before the original film is placed over the tables and the sequencing diagram shown in Figure 29 is based thereon. If the trimming takes place after the inclusion of the original film, both tables will be moved in unison, and the sequencing cam for energizing the rear table release solenoid will be eliminated. It is believed that in view of the foregoing descriptions that the operation for this cycle will be clear from Figure 29.

A fifth sequence cycle is provided which will be used to simply sever a film between lines. As shown in Figure 29, it comprises actuation of the shearing mechanism.

It is not intended to set forth all the variations that may be made, but it is contemplated that many of the features of the invention disclosed may be carried out in other ways and that many widely different embodiments of the invention can be made without departure from the spirit and scope of the invention. Thus, other sequence cycles may be employed e. g. as the result of spacing the individual lines of corrections on the correction film differently from that disclosed, or other means for changing from one cycle to another may be used. It is therefore intended that all matter contained in the above description or shown in the accompanying drawings shall be interpreted as illustrative and not in a limiting sense.

What is claimed is:

1. A mechanism for correcting a film on which text matter has been printed in a phototypographical machine by replacing an incorrectly printed portion thereof with a correctly printed portion corresponding thereto from a correction film, said mechanism comprising, in combination, a power operated shearing unit and a power operated splicing unit arranged in side by side relation, a front table which supports the original film and the correction film in side by side relation, a rear table which supports the corrected film, power operated means for shifting said tables laterally with reference to the shearing unit and the splicing unit as well as laterally with reference to each other in performing the desired shearing and splicing operations, automatic power actuated mechanism for controlling the operation of all of said power operated elements in a predetermined sequence during a given machine cycle to effect a film correction, means for starting the operation of said automatic mechanism to initiate the machine cycle, and means for arresting the operation of said automatic mechanism at the close of the machine cycle.

2. A mechanism according to claim 1, wherein the means for starting the operation of the automatic mechanism include a manually operated clutch throw-in device.

3. A mechanism according to claim 1, wherein the means for arresting the operation of the automatic mechanism include an automatically operated clutch throw-out device.

4. A mechanism for correcting a film on which text matter has been printed in a phototypographical machine by replacing an incorrectly printed portion thereof with a correctly printed portion corresponding thereto from a correction film, said mechanism comprising a shearing unit for removing an incorrect portion from the original film and arranged in a stationary position, a splicing unit for joining the corresponding correct portion to the original film and also arranged in a stationary position, a first table movable to carry a section of the film and the correction film between the shearing and splicing units, a second table spaced from said first table and movable to carry a second section of the film between the shearing and splicing units, a frame member to hold said shearing and splicing units in side by side relationship, said frame member being movable transverse to said tables, and automatic means responsive to actuation of a starting means for sequentially operating the aforesaid mechanism elements in a predetermined sequence to effect a film correction, said automatic means including a plurality of power driven cams.

5. A mechanism according to claim 4 in which some of the cams directly effect a mechanism operation and the remainder of the cams control electric circuits which in turn effect a mechanism operation.

6. A mechanism according to claim 5 in which cams directly effecting a mechanism operation control the movement of the frame member and its position relative to the tables.

7. A mechanism according to claim 6 in which the frame is connected to the follower of a first cam and thereby moved into operating position as determined by one of a number of stops.

8. A mechanism according to claim 7 in which a second cam controls the interposition of a stop member between the movable frame and a fixed portion of the mechanism.

9. A mechanism according to claim 8 in which the interposition of the stop member limits frame movement to a position wherein a severing or splicing operation at the head of a line takes place and in which the removal of the stop member permits the frame to move to a position wherein a severing operation at the foot of a line takes place.

10. A mechanism according to claim 9 in which a pair of adjustable stops are provided to control the exact position of the frame when the stop member is interposed or withdrawn.

11. A mechanism according to claim 7 in which film locating means are moved out of locating position through a cam action when said frame is moved into an operating position.

12. A mechanism according to claim 11 in which the film locating means include a pair of pins for engaging perforations in the film, said pins being mounted for pivotal movement under control of a third cam.

13. A mechanism according to claim 5 in which the circuit controlling cams effect shearing and splicing operations and regulate movement of the film carrying tables.

14. A mechanism according to claim 13 in which each cam operates a mechanical switch which in turn completes a circuit for energization of a control solenoid.

15. A mechanism according to claim 14 in which the cams are interrelated so that the energization of the control solenoids takes place in a predetermined sequence and at predetermined times.

16. A mechanism according to claim 5 in which the circuit controlling cams are divided into groups only one group of which is operatively positioned at one time to effect mechanism operations.

17. A mechanism according to claim 16 in which each group of circuit controlling cams is adapted to provide a distinct sequence of mechanism operations.

18. A mechanism according to claim 17 in which means are provided for selectively moving one group of circuit controlling cams into operative position.

19. A mechanism according to claim 18 in which means are provided to prevent operation of the power driven cams when a group of circuit controlling cams are being moved into operative position.

20. A mechanism according to claim 4 in which means are provided so that only a single cam cycle is completed for each actuation of the starting means.

21. A mechanism according to claim 1, including means for adjusting the automatic mechanism to vary the predetermined sequence during any given machine cycle.

22. A mechanism for correcting a film on which text matter has been printed in a phototypographical machine by replacing an incorrectly printed portion thereof with a correctly printed portion corresponding thereto from a correction film, said mechanism comprising a shearing unit for removing an incorrect portion from the original film and arranged in a stationary position, a splicing unit for joining the corresponding correct portion to the original film and also arranged in a stationary position, a first table movable to carry a section of the film and the correction film between the shearing and splicing units, a second table spaced from said first table and movable to carry a second section of the film between the shearing and splicing units, a frame member to hold said shearing and splicing units in side by side relationship, said frame member being movable transverse to said tables, automatic means responsive to actuation of a starting means for sequentially operating the aforesaid mechanism elements in a predetermined sequence to effect a film correction, and power means under control of said automatic means for transporting the tables between the shearing and splicing units, said power means including means for driving the tables at a slower speed as said tables arrive at the shearing or splicing unit.

23. A mechanism according to claim 22 including detent means for controlling the positioning of the tables when the film is brought to the shearing or splicing unit.

24. A mechanism for correcting a film on which text matter has been printed in a phototypographical machine by replacing an incorrectly printed portion thereof with a correctly printed portion corresponding thereto from a correction film, said mechanism comprising a shearing unit for removing an incorrect portion from the original film and arranged in a stationary position, a splicing unit for joining the corresponding correct portion to the original film and also arranged in a stationary position, a first table movable to carry a section of the film and the correction film between the shearing and splicing units, a second table spaced from said first table and movable to carry a second section of the film between the shearing and splicing units, a frame member to hold said shearing and splicing units in side by side relationship, said frame member being movable transverse to said tables, automatic means responsive to actuation of a starting means for sequentially operating the aforesaid mechanism elements in a predetermined sequence to effect a film correction, and power means under control of said automatic means for transporting the tables between the shearing and splicing units, said power means including a reversible drive comprising a pair of gears rotating in one direction, one of said gears rotating a first gear in one direction, the other of said pair of gears rotating a second gear in the opposite direction through an intermediate gear, and a coupling member slidably keyed to a driving shaft and selectively engageable with either said first or said second gear.

25. A mechanism according to claim 24 in which the engagement of the coupling member with either the first gear or the second gear is electrically controlled.

References Cited in the file of this patent

UNITED STATES PATENTS

| | | | |
|---|---|---|---|
| 1,124,531 | Saltzman | Jan. 12, | 1915 |
| 1,207,506 | Cornwall | Dec. 5, | 1916 |
| 1,916,311 | Hayden | July 4, | 1933 |
| 2,200,203 | Heintz | May 7, | 1940 |
| 2,377,292 | Donaldson | May 29, | 1945 |
| 2,468,629 | Herzig et al. | Apr. 26, | 1949 |
| 2,606,136 | Garrett et al. | Aug. 5, | 1952 |